United States Patent [19]

Price

[11] Patent Number: 5,075,815

[45] Date of Patent: Dec. 24, 1991

[54] STACKABLE POWER FACTOR CORRECTORS

[76] Inventor: William K. Price, 115 E. 176th St. N., Skiatook, Okla. 74070

[21] Appl. No.: 519,938

[22] Filed: May 7, 1990

[51] Int. Cl.$^5$ .............................................. H01G 1/08
[52] U.S. Cl. .................................... 361/274; 361/329
[58] Field of Search ................ 361/328, 329, 330, 274

[56] References Cited

U.S. PATENT DOCUMENTS

| | | | |
|---|---|---|---|
| 2,264,994 | 12/1941 | Marbury et al. | 361/306 X |
| 3,098,956 | 7/1963 | Hammer et al. | 361/274 |
| 3,441,816 | 4/1969 | Butrico | 361/274 |
| 3,571,676 | 3/1971 | Hottinger | 361/329 |

Primary Examiner—Donald A. Griffin
Attorney, Agent, or Firm—Head & Johnson

[57] ABSTRACT

A universal capacitive power factor corrector usable with single or three phase inductive motors encases three capacitors, each of equal capacitance in the range of 15 to 60 microfarads, within a housing having an access hole and a removable front wall. Each of the capacitors has first and second electrical terminals. In single phase motors, a first insulated conductor electrically connects each of the first electrical terminals and a second insulated conductor electrically connects each of the second electrical terminals. For three phase inductive motors, a first insulated conductor electrically connects the first terminals of the first and the third capacitors, a second insulated conductor electrically connects the second terminals of the second and third capacitors and a third insulated conductor electrically connects the first terminals of the second capacitor and the second terminal of the first capacitor. Resistors electrically connect the conductors to dissipate the charge stored. The conductors extend through the access hole for electrical connection in parallel with the inductive motor. An appropriate number of connectors based on the motor horsepower can be connected in parallel to provide power factor correction appropriate to that horsepower. A minimal number of varied corrector sizes can thus be used to achieve correction for a wide range of motor sizes.

8 Claims, 1 Drawing Sheet

STACKABLE POWER FACTOR CORRECTORS

BACKGROUND OF THE INVENTION

This invention relates generally to energy saving devices and more particularly concerns the reduction of electrical energy demands of smaller or moderate consumers.

More sophisticated electrical energy consumers are well aware of the impact of power factors on power demand. A low plant power factor will require an available capacity much greater then is actually used. Therefore, to avoid premium charges applied to low power factor customers, the large consumer will "correct" its overall power factor by adding to its system a load which draws the opposite kind of reactive power. Normally, the existing reactive power is inductive, caused by motors, transformers, fluorescent lights and the like, resulting in a lagging kvar (kilovolt amperes reactive). Thus a corrective bank of capacitors is added to the system, providing a leading kvar to balance the system.

The analysis of overall system impedance to determine the corrective load needed to adjust the power factor toward unity is for the most part not within the knowledge or economic capability of the smaller or moderate consumer. As a result, they generally continue to operate at uncorrected power factor levels, drawing more current than actually needed for their load and absorbing the cost of correspondingly larger heat losses in their system.

However, perfect matching of reactive power is not necessary to achieve a savings in energy costs. Significant savings can be achieved by approximation of balancing kvar with respect to individual loads in the overall system. Approximate power factor correction of an induction motor will reduce heat losses and lengthen motor life as well as increase available capacity for other loads in the system. Thus smaller plants, commercial facilities and even residences could benefit by application of corrective reactive loads to most machines, air conditioners and refrigeration units, pumps and the like if a single, cost effective, easily selectable, power factor corrective load were available.

Every consumer has the ability to readily ascertain the nameplate data of inductive motors used in their system. An understanding of the meaning of that data is not necessary to achieve an approximate power factor correction if a standard approximate corrective load corresponding to that data is available. No such device is known on the market today.

Therefore, it is an object of this invention to provide a standardized series of capacitor load devices from which a device effective to correct the power factor of a motor can be selected solely by reference to the known horsepower, phase and voltage of the motor. It is also an object of this invention to provide a standardized series of capacitive load devices in which multiples of the standardized devices can be readily combined for adaptation to specific requirements. It is a further object of this invention to provide a standardized series of capacitive load devices in which the capacitive elements are employed in multiples readily adaptable to single or three phase operation. And it is an object of this invention to provide a standardized series of capacitive load devices that may be easily installed by the user.

SUMMARY OF THE INVENTION

In accordance with the invention, a capacitive power factor corrector for use with single or three-phase inductive motors includes a housing with a removable cover and an access hole through one of the fixed walls of the housing. Three capacitors, each having equal capacitance, are removably mounted within the housing. Capacitors of a capacitance in the range of 15 to 60 microfarads selected at increments such that combinations of separate correctors can be employed to accommodate various sizes of small to medium size motors, say in the range of two to one hundred horsepower. For single phase motors two electrical conductors are employed, one connecting a first terminal of each of the capacitors in common and the other connecting the other terminal of each of the capacitors in common. The resistor is electrically connected across the two conductors. The insulated conductors extend out of the housing through the access hole. For three phase operation, three conductors are used, one conductor electrically connecting one capacitor's first terminal to another capacitor's first terminal, a second conductor connecting the first capacitor's second terminal to a third capacitor's second terminal and the third conductor connecting the remaining terminals. One resistor is electrically connected between one of the conductors and a second conductor and another resistor is electrically connected between one of those conductors and the remaining conductor.

Multiple sets of three capacitors will be included in the same housing provided each set includes capacitors of equal capacitance to each other, though not necessarily equal to the other sets. In this case, one of the capacitors in each set of capacitors will be connected in parallel with a corresponding capacitor of the first set.

Thus, one or multiple power factor correctors may be connected in parallel to an inductive motor to bring the power factor of the system closer to unity.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
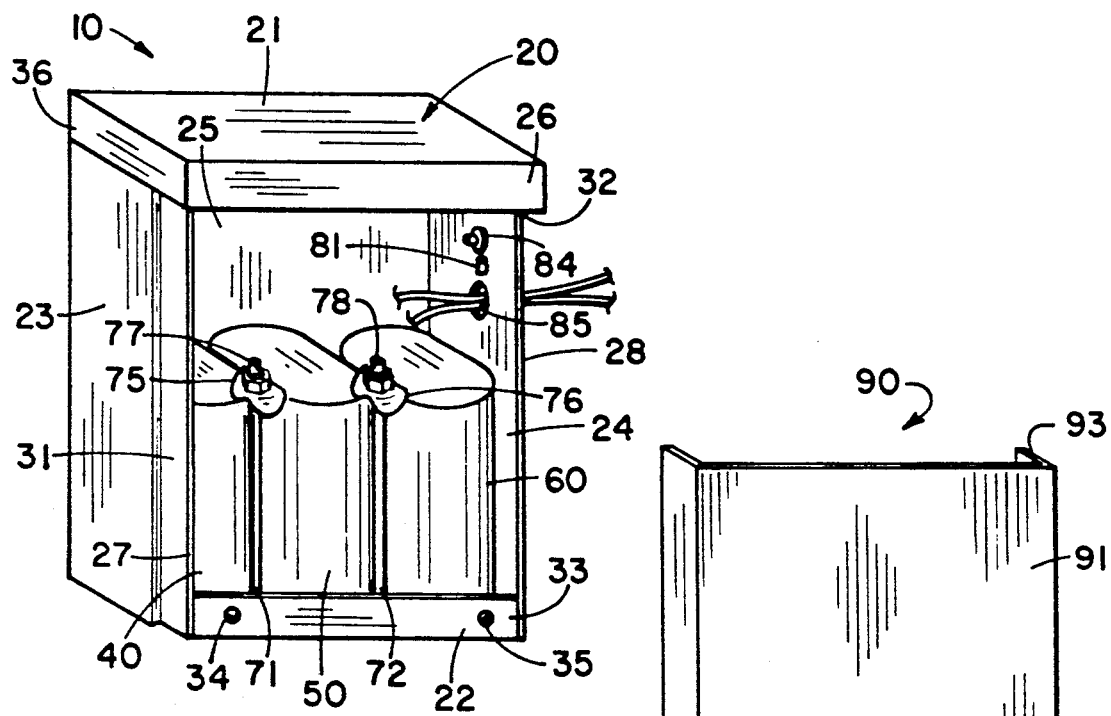
FIG. 1 is a perspective elevational view of a capacitive power factor corrector according to the present invention without the electrical connections.

Turning to FIG. 1, a typical capacitive power factor corrector is illustrated in the unwired condition. The corrector 10 consists of a rectangular housing 20 having top 21, bottom 22, side 23 and 24 and back 25 walls integrally formed from a sheet of steel, perhaps in the range of 1/16" thick. The top wall 21 is downwardly turned to provide a top flange 26 which extends across the housing 20 and is slightly forwardly spaced with respect to the front edges 27 and 28 of the side walls 23 and 24. The side walls 23 and 24 are also slightly inwardly offset proximate their front edges 27 and 28 to provide seats 31 and 32 along the length thereof. The bottom wall 22 is upwardly turned to provide a bottom flange 33 which extends across the housing 20. A pair of threaded holes 34 and 35 are spaced apart through the bottom flange 33. The top wall 21 and the bottom wall 22 may also be downwardly and upwardly turned respectively at their sides to provide side flanges 36, such that the side walls 23 and 24 and the appropriate flanges 36 may be welded together to form the completed housing 20, the top side flanges 36 being external to the housing 20 and the bottom side flanges being internal to the housing 20.

Figure 3:
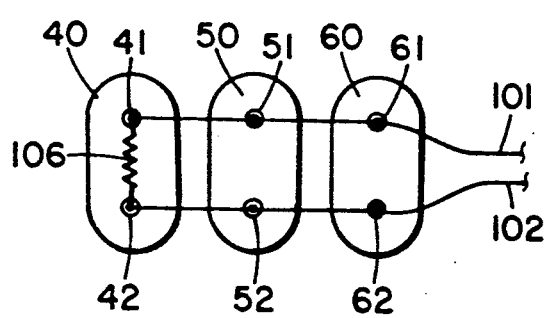
FIG. 3 is a top view of the capacitors of a power factor corrector connected for a single phase operation.
Figure 4:
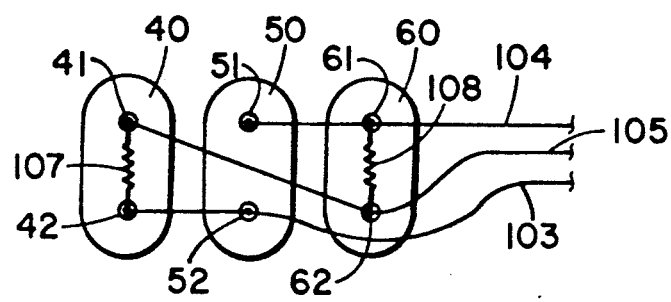
FIG. 4 is a top view of the capacitors of the power factor corrector connected for three-phase operation.

Within the housing 20 are mounted three capacitors 40, 50 and 60, all seated on the bottom wall 22 in side by side relationship parallel to the side walls 23 and 24 of the housing 20, with their terminals 41 and 42, 51 and 52, 61 and 62, respectively, being topwardly accessible (see FIGS. 3 and 4). The capacitors 40, 50 and 60 are secured in this position by two long bolts 71 and 72 which extend upwardly through holes provided in the bottom wall 22 of the housing 20 so that the bolts 71 and 72 are forward of and between the capacitors. Clamps 75 and 76 slide over the bolts 71 and 72 and are tightened down on the capacitors by nuts 77 and 78 to secure the capacitors in place in the housing 20.

The housing 20 may also be provided with a grounding contact such as the clip 81 secured through a hole in the side wall 24 by a screw and nut 84. A wiring access hole 85 may be provided anywhere in the portion of the housing 20 above the capacitors.

Figure 2:
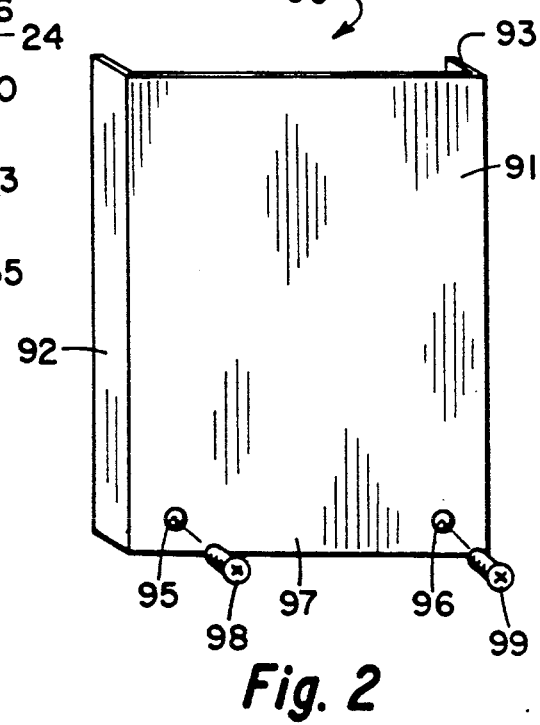
FIG. 2 is a perspective elevational view of the cover plate for use with the housing of FIG. 1.

As shown in FIG. 2, the housing 20 is closed by a cover plate 90, perhaps of 1/16" thick steel, having a front face 91 and integral side flanges 92 and 93. The top edge 94 of the plate 90 is inserted under the top front flange 26 with the side flanges 92 and 93 sliding externally onto the seats 31 and 32, respectively. Holes 95 and 96 spaced apart along the bottom edge 97 of the cover plate 90 align with the holes 34 and 35 in the housing bottom flange 33. Screws 98 and 99 secure the plate 90 in place on the housing 20.

The capacitors 40, 50 and 60 are selected to have equal capacitance suited to provide approximate power factor correction to a selected range of motor horsepower by use of multiple correctors 10. For example, it has been found that for 3 phase, 220 volt motors of 10, 20 and 30 horsepower, a 15% energy saving or more can be obtained by using multiples of 45 microfarad capacitors. That is, using 45 microfarad capacitors, one corrector would effectively serve a 10 horsepower motor, two would effectively serve a 20 horsepower motor and three would effectively serve a 30 horsepower motor. Similarly, using 40 microfarad capacitors, one corrector would effectively serve a 7½ horsepower motor while two will be effective for a 15 horsepower motor. Since all of the apparatus of a given corrector are equal, correctors can be combined in any arrangement to obtain the approximate capacitive correction for any size motor. For example, a consumer with a 3 phase, 220 volt, 25 horsepower motor could combine two 40 microfarad correctors with one 45 microfarad corrector. Thus, with the present invention, a consumer can custom design an energy saving device by knowing the phase, voltage and horsepower data of the motor to be converted. All that needs to be done is combine correctors of any horsepower ratio, but having the same phase and voltage data, to total the horsepower of the motor to be converted. This is possible because the total capacitance of capacitors connected in parallel is equal to the sum of their individual capacitances. It has been found that a selection of connectors having individual capacitors with capacitance in the range of 15 to 60 microfarads will accommodate most needs of the smaller or moderate energy consumer.

The internal wiring of the corrector 10 for single phase operation is illustrated in FIG. 3. The capacitors 40, 50 and 60 are connected in parallel by joining one of their terminals 41, 51 and 61 with a common conductor 101 and their other terminals 41, 52 and 62 with a common conductor 102. The conductors 101 and 102 extend through the access hole 85 for connection to the system. If multiple correctors are needed, they are simply connected to the system in parallel.

The internal wiring of the corrector 10 for three phase operation is illustrated in FIG. 4. Three conductors 103, 104 and 105 extend into the housing through the access hole 85. One conductor 103 is connected to two capacitor terminals 42 and 52, one conductor 104 is connected to two capacitor terminals 51 and 61 and the last conductor 105 is connected to the two remaining capacitor terminals 41 and 62. As with the single phase corrector, if multiple units are required they are simply connected in parallel to the motor to be corrected.

The above circuits can further be modified to permit the bleeding of the charge across the capacitors. This is accomplished in the single phase circuit of FIG. 3 by connecting a discharge resistor 106 across the conductors 101 and 102 and in the three phase circuit of FIG. 4 by connecting one discharge resistor 107 across the conductors 103 and 105 and another discharge resistor 108 across the conductors 104 and 105. Of course, any arrangement of two resistors connecting one conductor to the other two conductors would suffice.

It will be readily apparent that individual corrector units could contain multiples of three capacitors so as to include all the capacitors needed for phase correction of any size motor in a single housing.

Thus, it is apparent that there has been provided, in accordance with the invention, an energy saving device that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A capacitive power factor corrector for use with a single phase inductive motor comprising:
   a housing having an access hole therein and a removable front wall;
   three capacitors each of equal capacitance in the range of 15 to 60 microfarads disposed within said housing, each of said capacitors having first and second electrical terminals;
   a first insulated conductor electrically connecting each of said first electrical terminals;

a second insulated conductor electrically connecting each of said second electrical terminals; and a resistor electrically connected between said first and second conductors;

said first and second insulated conductors extending through said access hole for electrical connection in parallel with the inductive motor.

2. The device according to claim 1 further comprising means for detachably securing said capacitors in said housing.

3. The device according to claim 1 further comprising a second set of three capacitors disposed within said housing, each of equal capacitance in the range of 15 to 60 microfarads, each of said capacitors having first and second electrical terminals, said first insulated conductor electrically connecting said first terminals of said second set of capacitors and said second insulated conductor electrically connecting said second terminals of said second set of capacitors.

4. The device according to claim 1 further comprising means for detachably securing said capacitors in said housing.

5. A capacitive power factor corrector for use with a three phase inductive motor comprising:

a housing having a removable front wall and an access hole therein;

three capacitors, each of equal capacitance in the range of 15 to 60 microfarads disposed within said housing, each of said capacitors having first and second electrical terminals;

a first resistor electrically connected between said first and second terminals of one of said capacitors;

a second resistor electrically connected between said first and second terminals of a second of said capacitors;

a first insulated conductor electrically connecting said first terminals of said first and the third capacitors;

a second insulated conductor electrically connecting said second terminal of said second and third capacitors; and a third insulated conductor electrically connecting said first terminal of said second capacitor and said second terminal of said first capacitor;

said first, second and third insulated conductors extending through said access hole for electrical connection in parallel with the inductive motor.

6. The device according to claim 5 further comprising means for detachably securing said capacitors in said housing.

7. The device according to claim 5 further comprising:

a second set of three capacitors, each of equal capacitance in the range of 15 to 60 microfarads, each of said capacitors having first and second electrical terminals, each of said second set of capacitors being electrically connected in parallel with a corresponding one of the first set of capacitors.

8. The device according to claim 7 further comprising means for detachably securing said capacitors in said housing.

* * * * *